(No Model.)
M. G. FARMER.
SYSTEM OF ELECTRIC LIGHTING.
No. 285,602. Patented Sept. 25, 1883.
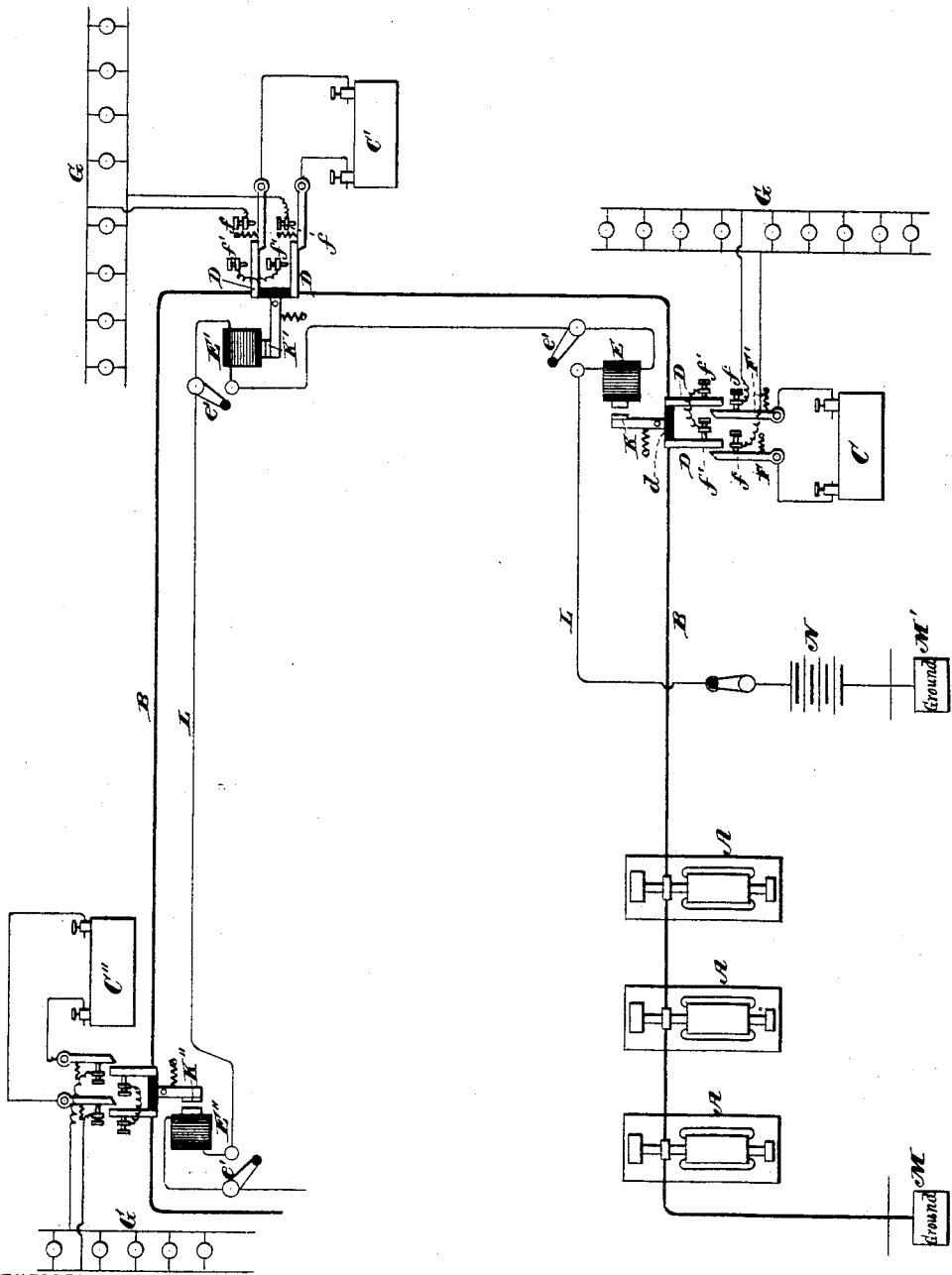
WITNESSES
INVENTOR
Moses G. Farmer.
By Parker W. Page,
Attorney

UNITED STATES PATENT OFFICE.

MOSES G. FARMER, OF NEWPORT, RHODE ISLAND.

SYSTEM OF ELECTRIC LIGHTING.

SPECIFICATION forming part of Letters Patent No. 285,602, dated September 25, 1883.

Application filed June 15, 1883. (No model.)

*To all whom it may concern:*

Be it known that I, MOSES G. FARMER, a citizen of the United States, and a resident of Newport, in the county of Newport and State of Rhode Island, have invented certain new and useful Improvements in Systems of Electric Lighting, of which the following is a specification, the same being a division of an application for Letters Patent filed by me October 11, 1881, No. 43,624.

My invention comprises a system of electrical generation and distribution involving the use of secondary batteries, by means of which electric energy may be economically produced, stored, and utilized for the production of light, power, or other analogous and useful purposes.

It is well known that the secondary batteries or accumulators with which my present invention is mainly concerned are practically applicable, when properly constructed and charged, to the same purposes as those for which ordinary batteries are or may be employed. It is, however, necessary to charge them repeatedly from some source of electricity—such as a magneto-electric machine or galvanic battery—and as they are capable of receiving only a comparatively-limited charge, which is soon expended, the operations of recharging, when the batteries are much used, are necessarily frequent. I propose to employ these batteries, or "accumulators," as they are now commonly styled, as an economical means of supplying under one general system a sufficient amount of electricity for purposes of illumination or power at a number of independent or isolated points—such as in houses or shops.

The system presently to be described is especially designed for electric incandescent lighting, though equally applicable to other purposes.

In pursuance of my invention, I locate accumulators of sufficient power or capacity at the various points to be lighted, and arrange them so as to be capable of being brought into a single main circuit from the source of supply, in order that they may all be simultaneously recharged at the most convenient time, and maintained in condition for supplying a current at such times as may be required.

By such arrangement—viz., a battery or batteries at all the points where the current is required, as, for instance, at the houses or shops of the subscribers, a main circuit connected with them, and a generator for charging them—many of the inconveniencies and disadvantages incident to the present systems are surmounted. The generators and engines require to be run only while charging the accumulators, whereas, were the lamps or other devices for converting the current connected with the circuit from the generators directly, the latter would be required to run for one lamp as well as for a thousand, great loss being thus occasioned. By my present system, however, this would not be the case, as the accumulators may be charged during a portion of the day and the current from them utilized while the engines are at rest.

I will now describe my invention more fully by reference to the accompanying sheet of drawings.

The letters C C' C'' are used to designate any number of independently-located storage batteries or accumulators, from each of which is taken a circuit represented by G, that is carried through a building to be illuminated, and in these circuits lamps or other devices are suitably arranged.

A A represent a group of dynamo-electric machines, located at a convenient point, and B a line wire leading therefrom and adapted to carry the current through the whole series of accumulators, and then to earth, or back to the generators, as may be desired.

With each accumulator or group of batteries is arranged apparatus for directing the current from the main line through the same and around them when they shall have received a full charge. These devices are capable of being modified in many ways, and I do not confine myself to the specific construction shown. The devices hereinafter described, however, are both simple and convenient, and may advantageously be used in any system of this kind.

The current from the generators A is led by wire B to a plate or bar of metal, D. This is attached to a pivoted frame of insulating material, the cross-piece *d* of which carries, at its opposite end, a bar, D, similar to that first mentioned. Two contact points or stops, $f'f'$, connected by a metal strip or wire, are interposed in the path of the plates D, so that when the said plates are in contact with said stops a path for the current is afforded around the accumulator to the continuation of circuit B, which connects with the plate D.

F F' are hinged plates or bars whose ends are interposed in the path of plates D on opposite sides of the same to the stops or pins $f'f'$, so that when the plates D are swung or tilted away from stops $f'$ and into contact with plates F F', the path for the current is through the accumulators. I prefer to arrange the stops $ff$, forming the terminals of the local or lamp circuits, in the path of the plates F F', so that when the latter are in contact with plates D D the continuity of the circuit between the accumulator and the lamps may be broken. This particular arrangement may be modified, however, as by taking the circuits G directly from the poles of the accumulators. To charge the accumulators, then, the plates D D are turned to the left and into contact with plates F F' until the accumulator is charged, when they are turned back into their normal position—that is to say, resting on the stops $f'f'$. With the plates D D and F F' suitable springs may be arranged with a tendency to maintain the former in contact with the stops $f'f'$, the latter in contact with stops $ff$. With each accumulator devices of this kind are used, so that a description of one set answers for all.

The movement of the levers or frames carrying the plates D D, I control from a single point—as at the source of electrical supply—through the instrumentality of electro-magnets or other well-known equivalents included in an independent circuit. In illustration of this I have shown on the ends of the said frames armatures designated, respectively, K K' K". In face of these are placed electro-magnets E E' E", included in a circuit, L, from any desired source of current, as a battery, N. The path for the main or charging circuit, as stated above, is, normally, around all of the accumulators. If, therefore, it is desired to charge them, they are brought into the charging-circuit by closing the circuit L, and thus energizing the magnets E E' E". By this means the armatures K K' K" are drawn over the frames carrying plates D D, shifted to bring the latter in contact with the battery-terminals, so that the current passes through the batteries. When the latter have been charged for a desired length of time, they may be cut out from the charging-circuit and connected with their respective working-circuits by interrupting the circuit L.

In connection with each of the magnets E, E', &c., are shown switch-levers $e'$, for short-circuiting the said magnets, so that any one or all may be rendered permanently inactive without interfering with the action of the others.

The drawings illustrate the frames that carry the plates D D in different positions, the frames actuated by magnets E and E" being in the position occupied by them when no current is passing through the circuit L, or when the magnets E and E" are short-circuited by their levers $e'$, the frame actuated by magnet E' being in the position to which it is brought by energizing-magnet E'.

In a system such as I have now described the accumulators may be charged and discharged in any manner desired, though I prefer to charge all the independently-located batteries in series from the same line and then discharge each battery into a separate local circuit in which are devices in multiple arc. By this arrangement currents of high tension may be converted and utilized advantageously for running incandescent lamps or similar purposes.

In the above the several accumulators are described as located in or at the buildings to be illuminated. In place of this arrangement they may constitute independent stations subsidiary to one main or central station, the main advantage in either case being the great saving in the amount of conducting material which will be required in transmitting the current from the central or generating station to the lamps.

I desire to state that my invention is not limited to the specific character of the several mechanisms employed in the attainment of the results described. Any efficient form of secondary battery may be employed with the system and many of the ordinary generators used in charging them. When once charged, the various purposes to which they may be applied will suggest themselves to those skilled in the art.

In other applications I have shown and described automatic means for connecting and disconnecting the batteries from the charging-circuit at given intervals of time, or when the said batteries shall have acquired a certain charge. I have also described and shown systems in which the batteries are arranged with reference to the generators and to the devices run by the batteries in certain novel ways, and I do not therefore claim in this application any of the features to which I allude, but reserve the right to make subject of other applications any features of novelty herein shown or described but not claimed.

What I now claim is—

1. The combination, with a main circuit from one or more electrical generators, a secondary or storage battery or batteries, and switch mechanism for bringing the same into or out of the main circuit, of an independent circuit for controlling the said switch mechanism, as and for the purpose specified.

2. The combination, with a main circuit from one or more electrical generators and secondary or storage batteries located at intervals along the same, of an independent circuit leading to each of the batteries, and including electro-magnetic circuit-controlling devices for directing the current from the main circuit through or around the batteries.

3. The combination, with a main circuit from one or more electrical generators and secondary batteries located at intervals along the same, of an independent circuit leading to each of the batteries, electro-magnetic circuit-controlling devices for directing the current through or around the batteries, and switches for short-circuiting said controlling devices, as and for the purpose set forth.

4. The combination, substantially as hereinbefore set forth, of a dynamo-electric machine or generator, a main line over which the current of said generator is conducted, a series of independent secondary batteries to be charged from said main line, a series of switches—one for each of said batteries—to simultaneously throw said batteries into the circuit of the charging-line, and a single independent line including electro-magnets to operate said series of switches.

5. The combination, substantially as hereinbefore set forth, of a dynamo-electric machine or generator, a main line over which the current of said generator is conducted, a series of independent secondary batteries to be charged from said main line, a series of switches—one for each of said batteries—to simultaneously throw said batteries into the circuit of the charging-line, a single independent line including electro-magnets to operate said series of switches, and a second series of switches—one for each of said batteries—by which any one or more of said batteries may be cut out from the main line for an indefinite period without cutting out others or interfering with their operation.

6. The combination, with a main charging-circuit from one or more electrical generators, multiple-arc or working circuits, and intermediate secondary batteries, of means for connecting said batteries alternately with the charging-circuit and their respective working-circuits, and an independent circuit for controlling said means, as set forth.

7. The combination, substantially as hereinbefore set forth, of a dynamo-electric machine or generator, a main line to receive the electric current of said generator, a series of independent secondary batteries electrically connected with said main line to be charged therefrom, a working-circuit for each of said independent batteries including electrical apparatus to be operated by the energy of said batteries, and a switch for each of said batteries, whereby any one or more of said batteries may be cut out from the main line for an indefinite period without cutting out the others.

8. The combination, substantially as hereinbefore set forth, of a dynamo-electric machine or generator, a main line to receive the current of said generator, a series of independent secondary batteries electrically connected with said main line to be charged therefrom, an independent working-circuit for each of said independent batteries, and a series of switches by which said batteries may be simultaneously connected in circuit to be charged from the main line, and then simultaneously cut out to constitute independent sources of electric supply.

In testimony whereof I have hereunto set my hand this 14th day of June, 1883.

MOSES G. FARMER.

Witnesses:
GEO. H. TAYLOR,
W. H. HARTLEY.